United States Patent
Felt et al.

(10) Patent No.: US 9,554,188 B2
(45) Date of Patent: Jan. 24, 2017

(54) SHOCK BLOCK

(71) Applicant: Verizon Patent and Licensing Inc., Arlington, VA (US)

(72) Inventors: Michelle Felt, Randolph, NJ (US); Arulvadivel Venugopal, Franklin Park, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 52 days.

(21) Appl. No.: 14/470,218

(22) Filed: Aug. 27, 2014

(65) Prior Publication Data
US 2016/0066036 A1 Mar. 3, 2016

(51) Int. Cl.
*G06K 9/00* (2006.01)
*H04N 21/454* (2011.01)
*G11B 27/30* (2006.01)
*G11B 27/34* (2006.01)
*G11B 27/031* (2006.01)
*H04N 21/44* (2011.01)
*H04N 21/4402* (2011.01)
*H04N 21/442* (2011.01)
*H04N 21/4545* (2011.01)
*H04N 21/475* (2011.01)

(52) U.S. Cl.
CPC ......... *H04N 21/4542* (2013.01); *G11B 27/031* (2013.01); *G11B 27/30* (2013.01); *G11B 27/34* (2013.01); *H04N 21/44008* (2013.01); *H04N 21/44029* (2013.01); *H04N 21/44213* (2013.01); *H04N 21/440245* (2013.01); *H04N 21/45455* (2013.01); *H04N 21/45457* (2013.01); *H04N 21/4755* (2013.01)

(58) Field of Classification Search
None
See application file for complete search history.

(56) References Cited

U.S. PATENT DOCUMENTS

| | | | | |
|---|---|---|---|---|
| 6,317,795 B1 * | 11/2001 | Malkin | ............... | H04N 7/162 345/619 |
| 8,385,610 B2 * | 2/2013 | Corcoran | ........... | G06K 9/00228 382/103 |
| 8,509,496 B2 * | 8/2013 | Steinberg | ........... | G06K 9/00228 382/103 |
| 2005/0078944 A1 * | 4/2005 | Risan | ...................... | G06F 21/10 386/213 |
| 2008/0092181 A1 * | 4/2008 | Britt | ...................... | H04N 7/1675 725/87 |
| 2008/0132187 A1 * | 6/2008 | Hanebeck | ............. | G11B 27/105 455/186.1 |
| 2010/0070992 A1 * | 3/2010 | Morris | ............... | H04N 7/17336 725/32 |
| 2010/0277411 A1 * | 11/2010 | Yee | .......................... | G06F 3/017 345/156 |

(Continued)

*Primary Examiner* — Nancy Bitar (57) ABSTRACT

A system may include a media processor that categorizes at least one scene of a media stream into a category. The media processor may further provide an output media stream that alters the at least one scene of the media stream based on the category, where the category may be shocking or scary scenes. A method may include categorizing, using a computing device, at least one scene of a media stream into at least one category. The method may further include altering, using the computing device, the at least one scene of the media stream based on the category.

18 Claims, 4 Drawing Sheets

(56) References Cited

U.S. PATENT DOCUMENTS

| | | | |
|---|---|---|---|
| 2013/0283162 A1* | 10/2013 | Aronsson | G11B 27/105 715/719 |
| 2013/0343727 A1* | 12/2013 | Rav-Acha | G11B 27/28 386/282 |
| 2013/0343729 A1* | 12/2013 | Rav-Acha | G11B 27/28 386/285 |
| 2015/0074696 A1* | 3/2015 | Morris | H04N 7/17336 725/12 |
| 2015/0106623 A1* | 4/2015 | Holman | H04L 63/0457 713/171 |
| 2015/0181291 A1* | 6/2015 | Wheatley | H04N 21/4542 725/10 |

* cited by examiner

SHOCK BLOCK

BACKGROUND

As technology improves movies and television shows are also improving their use of high-definition high-quality visual and audio effects to make depictions of scary, shocking and bloody scenes more and more realistic. Some television series are known for often have scary, shocking and bloody scenes. Such scenes are intended to promote a physical response in the viewer, and in some situations may cause an undesirable negative outcome. In some situations, for example, increased stress and corresponding blood pressure may in some cases result in a heart attack in sensitive individuals. Moreover, graphic scenes may psychologically affect certain sensitive individuals as well as classes of viewers (e.g., younger viewers as well as more senior viewers). For such viewers, the memory of viewing a hyper-realistic audio-visual scene may disturb them and stay in their mind for a long time as a re-occurring and unpleasant memory.

Sometimes, it happens that a viewer catches such a scene unintentionally, perhaps while changing channels, or when watching a show they are not familiar with and not realizing scenes may occur that could be offensive or disturbing to them.

Alternatively, some users may have a predilection for being scared and may wish that such scenes remain unaltered.

What is desired is a way to avoid a person seeing scenes that will disturb their sensitivities or inadvertently result in either a physical or psychological trauma.

DETAILED DESCRIPTION

A media processor may implement a shock block system that can play media content and alter certain content based on stored user preferences and categories of scenes. For example, a user preference may be to avoid viewing or potentially listening to scenes incorporating blood and gore (e.g., to obscure or block the scene and/or to at least partially mute the sound). In this manner a viewer may avoid being disturbed by content to which there is anticipated sensitivity.

A shock block system may contain a preprocessor that assigns preprocessed information to an instance of media (e.g., a video), for example categorizing scenes or segments as scary or gory using their graphic content. This is distinct from a rating that applies overall to an entire instance of media. For example, a movie may be assigned a rating such as General (G), Parental Guidance (PG) or Restricted (R) from the Motion Picture Association of America. In the latter case, a viewer may be precluded from seeing a PG movie even if it only has one or two scenes where parental guidance may be desired. Moreover, some adults may actually be more offended by or adversely affected by some content as compared to minors. Thus, it would be desirable for a user to be able to control the viewing of certain portions of the instance of media using a greater level of granularity as compared to being bound to a rating of the entire instance of the media that may have been assigned because of only one or two scenes that are potentially objectionable to some viewers.

When the shock block system plays the media (e.g., the video), with a media player, the media player can alter the playback based on an assigned category for a scene. For example, the media player can hold information in regards to user preferences to not see scary or gory scenes. When the media player is playing the media and a scene categorized as scary or gory is encountered, the media player may alter the scene (e.g. blur the screen or change the color of the blood to gray) based on the user preferences so that the scene is no longer offensive to the consumer of the media.

Figure 1:
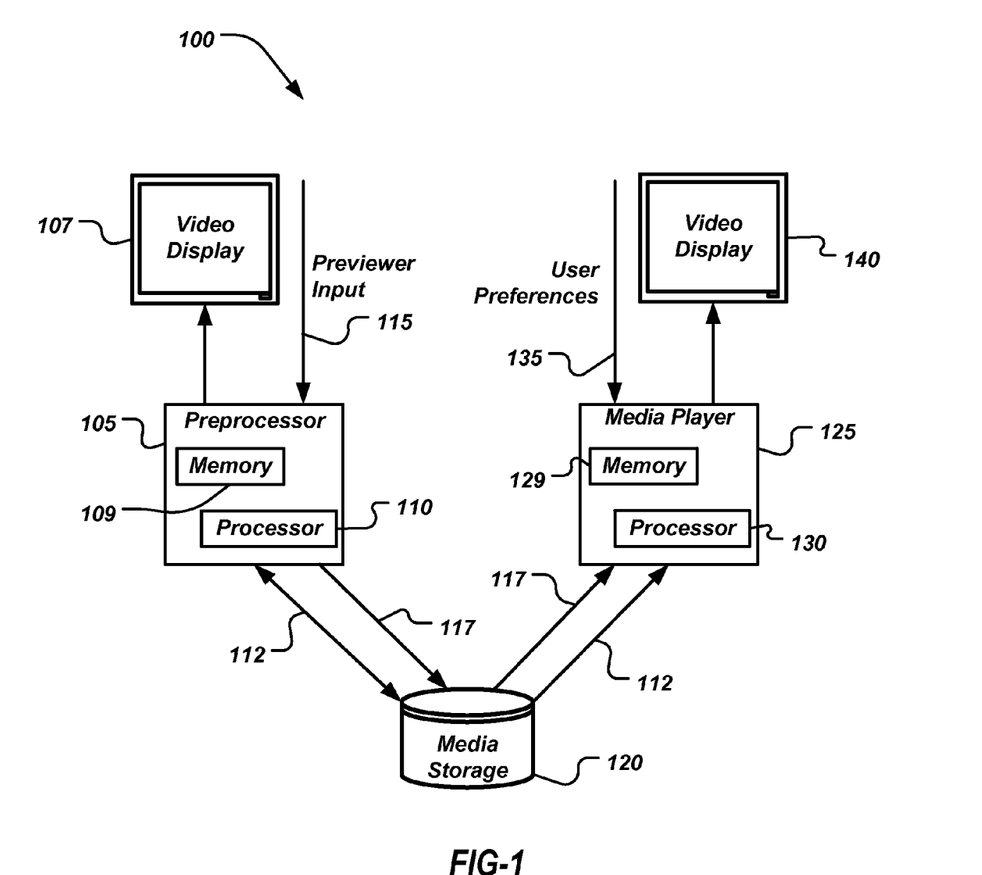
FIG. 1 illustrates an exemplary shock block system.

FIG. 1 illustrates an exemplary shock block system 100 that may have a preprocessor 105 and a media player 125 both of which may have access to media storage 120. System 100 may take many different forms and include multiple and/or alternate components and facilities. While FIG. 1 shows an exemplary system 100, the exemplary components illustrated in FIG. 1 are not intended to be limiting. Indeed, additional or alternative components and/or implementations may be used. For example, a designer of a shock block system may combine the preprocessor 105 and a media player 125 onto the same hardware, or separate the preprocessor 105 from the media player 125 by thousands of miles.

As illustrated in FIG. 1, system 100 includes the preprocessor 105. The preprocessor 105 is illustrated as a computing device including a memory 109 and a processor 110. It may receive a media stream 112 as an input, for example, coming from a media file stored on a tangible media storage 120. Input media stream typically includes at least streaming video incorporating a series of images presented over a predetermined time frame and often-synchronized audiovisual inputs. The memory 109 may contain a preprocessor program as described below. Alternatively, a media stream 112 may be received directly by the preprocessor 105 from another source (not shown), for example, a live broadcast. Once the preprocessor 105 receives a media stream 112 as an input. For example, the preprocessor may categorize scenes or segments of the media stream 112 (e.g., the graphic content may be categorized as bloody or gory). These scene or segment categories and other information (e.g. the areas of the screen that contain the blood or gore) may make up at least a subset of preprocessed information 117.

The preprocessor 105 may use the graphic content of the media to categorize media segments by automated or manual mechanisms into categories such as scary, spooky, creepy, horror, scary faces, killing, uncomfortable sounds (e.g. loud surprising noises, high-pitched screams, fingernails on chalkboard etc.), blood, gore, violence, disgusting, decomposing body, zombies, demons, monsters, fighting, hitting, bones breaking, skeleton, spiders, nudity, sexual, or other categories that might offend certain people. Other categories may be at the other extreme and annoy those who want to be scared or the like and are bored otherwise. Yet other categories may include additional aspects such as funny, serious, dramatic, scenery, no dialogue, dialogue, special effects, and credits rolling. The content of a scene may be summarized under an identifier for a human emotion. Thus, the categories may be identifiers for different human emotions; for example, labels for human emotions may include scared, surprised, shocked, horrified, amazed, sad, happy, bored, angry, fearful, disgusted, etc. The labels may be assigned by a viewer recording their perceived emotional reaction to the graphic content of the media. The assignment of the labels representing human emotions may be done by perceiving the senses of a viewer, for example, things that are visual (e.g. facial expression, goose bumps or muscle movement such a startled jump) or auditory (e.g., screams, changes in voice pitch or breathing), changes in body temperature, etc. Thus, any category may be available for selection if it proves useful to a consumer of the media. The preprocessor 105 may categorize the scenes or segments, of the video utilizing manual or automated techniques. For example, a manual technique may have the preprocessor 105 play the video on the video display 107 along with audio on speakers (not shown) for a previewer to watch. The previewer may be an individual or a group of people. The previewer may then provide previewer input 115 indicating at least one category for a scene of the media stream 112. The preprocessor 105 may tag scenes as containing elements associated with one or more of the categories. A scene encompasses a portion, e.g. a subset, of the media, typically a time segment of a media stream 112. A scene does not have to correspond to the camera scenes or dramatic scenes that are present in the media stream 112, although it may. A media stream 112 may be composed of a series of images as found in a video or a media stream may be just an audio track. It may also be a combination of the two.

Previewer input 115 may identify mask-areas from the image to obfuscate. The mask-areas are portions of the image that a viewer may not want to see, and the obfuscation of the mask-areas may be customized according to a selected category, for example black out, gray out, blur, distort color, pixelate, etc. The mask-areas in the image may be the portions of the image that contributed to the previewer categorizing the scene of the media into a particular category. For example, if the previewer input 115 flags a scene as being scary because it contains scary faces, the scary faces can then be associated with the mask-areas that may cover the scary faces. The preprocessor 105 may allow the previewer to indicate a mask-area by drawing a circle around areas of concern, pointing to the center of areas of concern, or constructing some other kind of geometric shape. The geometric shape may be positioned by a computer mouse and the size controlled by a rotary wheel on the computer mouse or the size may be controlled by clicking on the left and right mouse buttons, for example the left button could increase the size of the geometric shape and the right button could decrease the size of the geometric shape. These mask-areas may be part of the previewer input 115 and be part of the preprocessed information 117.

Alternatively, once the previewer input 115 flags a scene, for example, as containing scary faces, the preprocessor 105 may then determine the mask-areas automatically using facial recognition technology. In this case, the masking may be synchronized to the presentation of the input media stream to the extent that the facial recognition criteria are satisfied.

Alternatively, the previewer input 115 may be received by the preprocessor 105 as keystrokes. For example "F1" may indicate blood is displayed, "F2" may indicate a killing, "F3" may indicate a scary face, etc. The previewer input 115 may be generated when movie captions are being created for the media stream 112. In addition to a caption writer's normal duties, the predetermined keystrokes or alternative mechanisms may allow the caption writer to indicate the category or categories of a scene of the media stream 112.

In an alternate embodiment, the preprocessor 105 may automatically categorize visual scenes of an instance of media utilizing artificial intelligence such as a trained neural network system. Automatic categorization may be based on any details in the current frame along with previous frames looking for various objects or colors (e.g. decomposing bodies, the color of blood). Automatic categorization may utilize a form of image recognition technology such as facial recognition. The preprocessor 105 may automatically categorize audio segments (or audio scenes), of the media, for example indicating uncomfortable sounds, e.g. high-pitched screams, startling noises, fingernails on the chalkboard and the like. In some situations the visual and auditory portions may be separately analyzed for the same scene and automatically categorized by combining the corresponding cues received by the artificial intelligence of the preprocessor 105 (e.g., the curse or scream of a bystander to a witness observing the bloody murder of a victim where the video cues may include a murder weapon and blood). Moreover, the preprocessor 105 may assign more than one category to a scene. For example, a scene may be categorized as bloody, gory and creepy.

The preprocessor 105 may store the media stream 112 in media storage 120 with the preprocessed information 117. Time stamps or similar approaches may be used to synchronize the preprocessed information 117 with the media stream 112, the synchronization information being associated with both the media stream and the preprocessed information. In some situations, the preprocessed information 117 may actually be incorporated directly into media stream 112. The Media storage 120 may store media content. The media content can be just a single video, for instance a movie, or it may be a series of video, for example as found on a DVD containing a number of episodes from a television series. Alternatively, the media storage 120 may be a large collection of media content stored or indexed in a database, for example as might be found in a company that provides cable or online entertainment. Alternatively, the preprocessor 105 may directly provide the media stream 112 with preprocessed information 117, including scenes categorized, directly to the media player 125, not shown.

The media player 125 is illustrated as a computing device including a memory 129 and a processor 130 that receives a media stream 112 and preprocessed information 117 associated with the media stream 112 that may include information about categories for scenes as discussed above. The memory 129 may hold a media player program as described below. The media stream 112 and preprocessed information 117 may come from media storage 120, directly from the preprocessor 105 or from some other source. Attached to the media player 125 may be a video display 140 and speakers (not shown) for playing the media for a consumer of the media, e.g. a viewer or listener.

The media player 125 may have stored in memory 129 user preferences 135 received from the consumer. When the media player 125 plays a media stream 112, the media player 125 may use the preprocessed information 117 and the user preferences 135 to alter the media stream 112. For example, if the user preferences 135 indicate to blur any scary faces, then when the preprocessed information 117 identifies scary faces with a mask-area, the media player 125 may obfuscate the scary faces by blurring the mask-area.

In addition, the media player 125 may use different obfuscation techniques for different categories. The user preferences may indicate the media player 125 is to mask a mask-area in a scary scene with a smiley face, or may alter the mask-area with a finer pixilation then mask-areas of a gory scene.

In an alternative exemplary approach, the preprocessor 105 and the media player 125 may even allow each scene to specify a different obfuscation. In one scene, the media player 125 may obfuscate a scary face in an early scene of the video with a smiley face, in later scene the scary faces may be pixelated, and in a third scene the scary faces may be blurred.

The user preferences 135, also known as stored preferences, may include information regarding how the media player 125 should alter the media stream 112. For example, user preferences 135 may indicate that certain categories of scenes of the media stream 112 be subject to a video veil transformation or an audio mask transformation. The media player 125 may present a number of options to a consumer from which they can pick. For example, the consumer may be given the choice to select from a list containing 1) blur the image if it contains blood, 2) mute the sound for scenes identified as having frightening noises, 3) lower the volume for scenes identified as having surprise-loud noises, etc. If the consumer makes no selection then the media player may default to not altering the media stream 112. The media player 125 may store only one user preference, or the media player 125 may store multiple user preferences. The media player 125 may identify the viewers of the media by having the user selecting themselves on a menu, or the media player 125 may detect the viewer's personal digital device such as a cell phone by a wireless communication means for example Bluetooth, near-field communication or the like. Alternatively, the media player 125 may identify the users consuming the media by using a video camera and facial recognition technology. When the media player 125 identifies multiple consumers who are consuming the media, the media player 125 may choose to select the video veil transformation and the audio mask transformation the most conservative user preferences of those consuming the media, (e.g., obfuscating the scene the most when both adults and young children are viewing the media stream). Alternatively, the media player 125 may present the conflict between the user preferences to the consumers and allow them to select the user preferences to implement.

In yet another illustrative approach the media player may alter the playback differently depending on the type of device (e.g. a fixed device such as a television or desktop computer as compared to a mobile device such as a smart phone, portable player, tablet, "Google" glass, etc.). If the displays are size restricted as may be found on many mobile devices then the appropriate obfuscation may be different than if the playback is on a large high definition television. The smaller screen may only necessitate limited amount of obfuscation, whereas when played on a large screen than a different type of obfuscation may be appropriate. So for a small screen some pixelation of the image may obfuscate the offending portion of the screen, where for a large screen a blurring effect may be more effective. Similarly for audio media, if the playback is on a portable media player with earbuds, the audio mask may be different than if playback is in a home studio with surround sound. For example, while a "Boom" sound may require very little dampening when played on an earbud, there may be a need for significant dampening to lose the "Boom" effect on a surround sound system with large bass speakers.

A video veil is a transformation that may be applied to a media stream and the video veil may take on many different forms. A video veil may be a simple transformation that alters the input media stream to a blank screen. For example, the user preferences 135 may indicate to use a black screen video veil for all scenes the preprocess information 117 indicate are horror scenes of the input media stream 112, in which case the media player 125 may display a full black screen. Alternatively, the media player 125 may have user preferences 135 that indicate to use a video veil that distorts or obfuscates the mask-areas of the display for a horror scene. The video veil may only transform sections of the screen. The sections of the screen may indicate the scary faces, for example zombies, demons and monsters etc. These scary face sections of the screen may have been indicated as mask-areas as discussed above. The video veil may distort or obfuscate by blurring, pixelating, dimming or any other distortion/obfuscation that renders at least the undesired image within the input media stream 112 visually innocuous to the consumer. In some exemplary scenarios, the entire screen may be so altered.

The video veil may indicate a color mask, for example in scenes indicated as having blood the red could be changed to gray, black or other appropriate color to enable the blood to blend better with the surroundings. In scenes indicating gooey/disgusting substances, the color of those substances may be altered to be gray or black so the substances are not discernible, or the color could be changed to cheerful colors such as sunshine yellow or pretty pink. The preprocessor 105 may detect the gooey/disgusting substances based on specific colors and textures (e.g. the color of blood, and it being smooth, i.e. liquid) or by shape recognition algorithms that can detect edges or color regions that are smooth as would indicate gooey substances. The gooey/disgusting substances may be detected from the movement of the colors from one image of a video to the next image of the video or over a series of images where the detected movement is known to be indicative of movement of gooey/disgusting substances. The movement indicative of the movement of gooey/disgusting substances as may be derived from the manually marked mask-areas of previously preprocessed videos that indicate areas with gooey/disgusting substances.

The video veil may employ complex filters that alter the overall impression that the scene. For example, a brightening filter may take a dark and scary scene and brighten it up and enhance the color differences so that it is pleasant to see. For example, an image may have a standard amount of brightness added, for example 25% brighter. A cartoony filter might be utilized to change the scene to look less realistic and more like a cartoon so that it is not so threatening or scary. For example, a cartoony filter may be based on taking the amount of colors a pixel may have from a standard color depth (e.g., 32 bit with 16.7 Million colors) to only 32 colors. Other options may be running some edge detection processes and then the edges could be used to mark regions, and then the regions could have all the shades and details replaced by the average color in that region. These techniques and many other known by those skilled in the art could be used to make up various complex filters, such as a cartoony filter.

The preprocessed information 117 may include information about a layer/video effect in a digital channel along with the original media stream 112. For example, the digital channel may be subtitle tracks that are available for example in DVD recordings. The subtitle track may have encoded in it the category name to indicate the start of a particular category scene, and a separate indicator of the end of a category scene. Alternatively, instead of the category name a category code may be encoded. To allow for overlapping scenes a category may begin with "<category-name" and end with "category-name>." In this way multiple categories for the same image in the series of images making up the video can be included in multiple scenes. For example, assume that there is a scene that first has violence, followed by both violence and blood, next presenting a violent ending, and then finally the end of the showing of blood. Such a scenario may be encoded in an available video or audio track as follows: "<violence . . . <blood . . . violence> . . . blood>" The information regarding the layer/video effect may be used by the video veil to identify the categorized scenes to use when determining how to alter the media stream 112 as the user preferences 135 indicate.

The user preferences 135, also known as stored preferences, may include information about how to alter the audio. For example, the user preferences 135 may indicate that, for certain categories of scenes, the audio will be subject to an audio mask. Audio mask options may include full mute, beeps, alternative audio, volume reduction or other such alterations that remove the offensive characteristic of the audio track. A full mute audio mask operates by entirely removing the audio track. For example, during scene categorized as horror, the user preferences 135 may indicate the audio track is to be muted. Thus a horror scene that includes a woman screaming in terror could be rendered silent. In addition, the user preferences 135 may indicate if the muting should start some pre-determined period of time ahead of the horror scene. In one implementation, some or all of the period of time ahead of the horror scene may be used to gradually reduce the audio track to silence; in this way a transition to muting may be achieved without an abrupt end, which in and of itself could be disconcerting to some viewers. Beeps for an audio mask may replace the audio track with a monotone beep. For example, on a scene categorized as horror, the provocative audio could be replaced with a monotone beep, or a bloodcurdling loud shrill could be replaced with a low volume monotone beep. The audio mask may be for an alternative audio track, so instead of eliminating all the dramatic effects they may be just minimized, for example replacing a loud scream with suspenseful music. An audio reduction audio mask may reduce the volume of the audio track such as by a controlled muting. For example, if the volume can be set to a value from 0 to 50 the volume could be reduced to level 1.

The user preferences 135 may include options to provide a warning ahead of a scene of a particular category. For example, text may be displayed on the screen indicating a surprise scare is about to occur. The text can provide a warning to the consumer allowing them to prepare and anticipate a particular category of scene. Another example would be a warning indicating that a killing was about to be depicted, and a parent could then skip over that scene to protect the young innocent from seeing such a scene. Alternatively, the user preferences may indicate to either freeze before the scene or just skip over such scenes automatically.

As opposed to the young or innocent there may be those thrill seekers who have a predilection for being scared. For consumers of this type, the media player 125 may use the video veil or the audio mask to accentuate effects, for example, trying to increase a scary event or the horror of a gory scene. The media player 125 may accentuate the surprise of a scary face popping into the scene by adding more contrast to the scary face as it pops into view, increasing the volume before a startling sound or providing a complex image filter that brings out the details in a gory scene.

In either situation, a video veil and/or audio mask may be used to modify a scene, the media player 125 may use the user preferences 135 for a particular video veil and audio mask effect to configure a modification layer. The modification layer may use the user preferences 135 along with the preprocessed information 117 to alter the media stream 112 during playback. The media player 125 may allow the consumer to configure the modification layer by offering various choices from which the consumer can select. If a consumer is willing to watch the content unaltered then no configuration of the modification layer would need to be done, and the modification layer merely functions as a pass-through layer that allows the media streams to pass through unaltered. If a person is a parent and wants to establish audiovisual parental censoring then the parent can configure the user preferences to alter the content as they feel is appropriate for their children. If a consumer is sensitive to being scared or shocked, they can configure the modification layer to alter these scenes as they desire.

Figure 2:
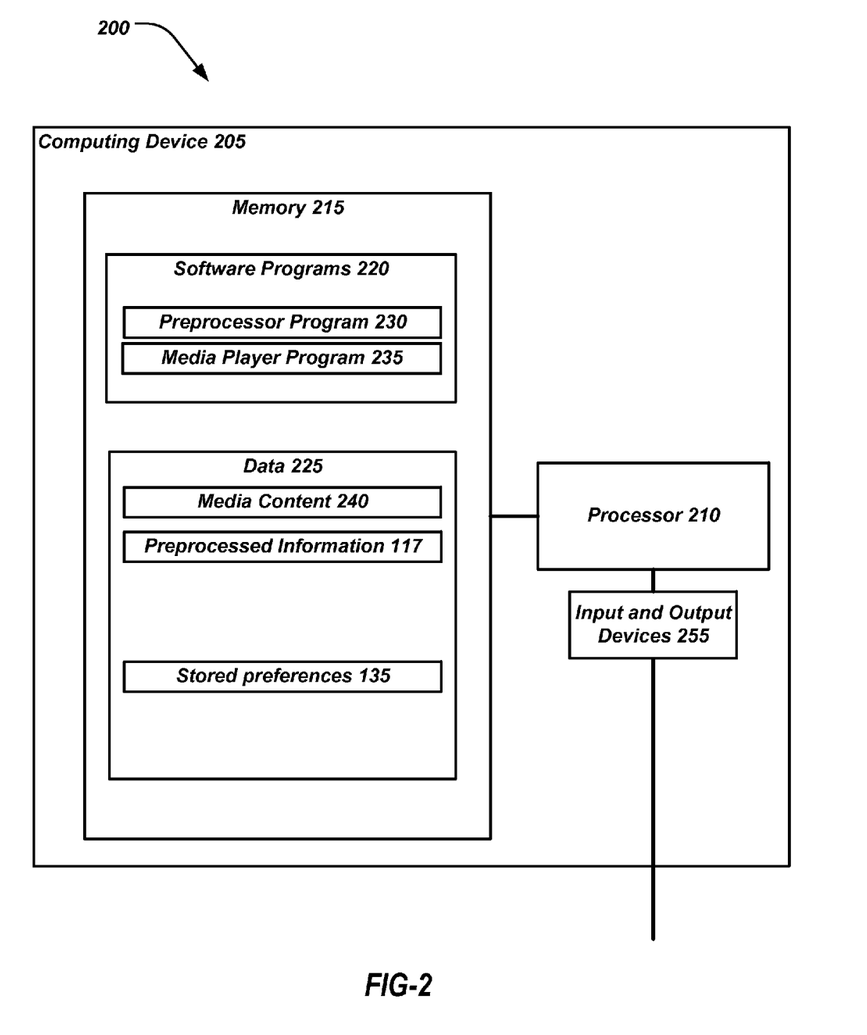
FIG. 2 illustrates a second exemplary shock block system.

FIG. 2 illustrates a second exemplary shock block system 200 implementation with a computing device 205 including a memory 215 and a processor 210 in communication with the input and output devices 255. The memory 120 includes both software programs 220 and data 225. The computing device 205 provides an alternative configuration from shock block system 100. In this implementation of the shock block system, the designer of the shock block system uses the single computing device 205 to act as both the preprocessor and the media player. The software programs 220 may include a preprocessor program 230 and a media player program 235 that enable the computing device 205 to perform as either the preprocessor or the media player.

The software programs 220, e.g. the preprocessor program 230 and the media player program 235, are preferably provided as software that when executed by the processor 210 provides the operations described herein. Alternatively, the software programs 220 and its preprocessor program 230 and media player program 235 may be provided as hardware or firmware, or combinations of software, hardware and/or firmware. Additionally, although one example of the modularization of the software program 220 is illustrated and described as the preprocessor program 230 and the media player program 235, it should be understood that the operations thereof may be provided by fewer, greater, or differently named modules.

The data 225 may include media content 240 that can be accessed as a media stream 112 is used by preprocessor program 230 and the media player program 235. The data 225 may also include preprocessed information 117 related to the media content 240. The data 225 may also store user preferences 135 that were provided by a user as described above.

In general, computing systems and/or devices, such as computing device 205, preprocessor 105 and media player 125, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, notebook, laptop, or handheld computer, or some other computing system and/or device.

Computing devices such as the preprocessor 105, media player 125 and computing device 205 generally include computer-executable instructions such as the instructions of the preprocessor program 230 and media player program 235, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Objective C, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

The media storage 120 may be a database. Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Figure 3A:
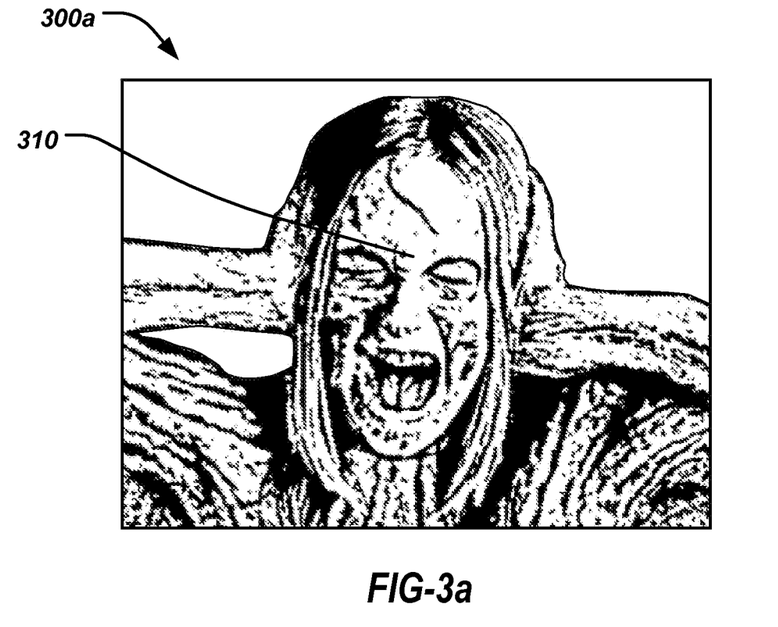
FIGS. 3a and 3b illustrate an image from a media stream altered by a video veil.
Figure 3B:
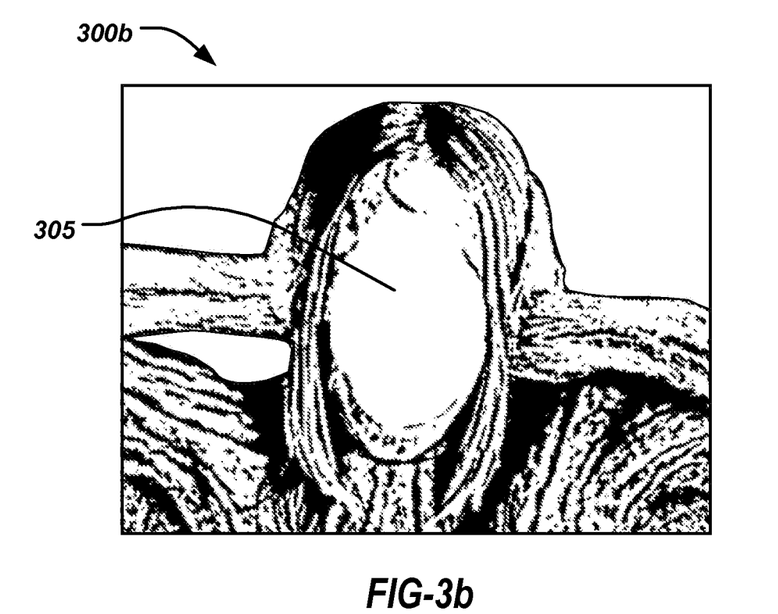

FIGS. 3a and 3b illustrate an image 300a from a media stream 112 altered by a video veil to produce a less scary image 300b. In this instance, the video veil is a mask 305 located over the scary screaming face 310.

Figure 4:
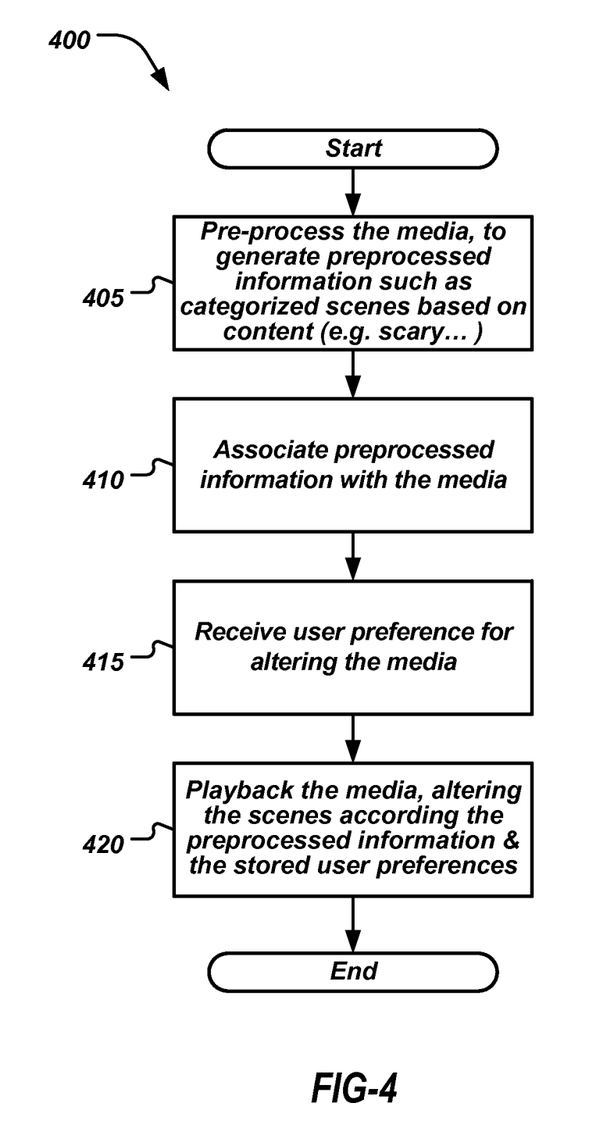
FIG. 4 illustrates a flowchart of an exemplary process that may be used by the exemplary shock block system of FIG. 1.

FIG. 4 illustrates a flowchart of an exemplary process 400 that may be used by the shock block system 100.

At block 405, the preprocessor 105 may preprocess the media to generate preprocessed information 117. The preprocessed information 117 may include identification of scenes in particular categories, for example scary, bloody or spooky.

At block 410, the preprocessor 105 may associate preprocessed information 117 to the media content, for example by writing it to media storage 120 in a subtitle track.

At block 415, the media player 125 may receive user preferences 135 for altering the media.

At block 420, the media player 125 may play the media and alter the scenes based on the user preferences 135 and scene categories as contained in the preprocessed information 117. After block 420, the process ends.

When a user of a media player, for example a television, is changing channels the user preferences may be enforced. For example, if the user preferences are set up to avoid displaying any scary or bloody scenes, the consumer can be assured they will not accidentally view such scenes while they are flipping through channels.

Although the description has focused on helping people avoid visual and/or audio components of scenes they are sensitive to, other objectives may be achieved. For example, if an individual has a particular predilection for being scared, the visual and/or audio components of scenes may be altered to accentuate the surprise and scary aspects.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A system comprising:
a media processor including a computer processor and a memory configured to:
identify a plurality of categories;
receive an input media stream to be displayed on a screen of a display device;
construct a mask-area with a geometric shape on a section of the screen of the display device to mask at least one segment of the input media stream;
preprocess the input media stream to associate the mask-area of the at least one segment of the input media stream to at least one category from the plurality of categories; and
alter the mask-area of the at least one segment of the input media stream based at least in part on the at least one category to create an altered media stream,
wherein the media processor comprises a modification layer that includes at least one of a video veil and an audio mask, and the modification layer selectively alters the input media stream to create the altered media stream based on the at least one category, and
wherein the media processor identifies the geometric shape drawn on the section of the screen in the at least one segment of the input media stream, the section of the screen contributing to classification of the at least one segment of the input media stream into the at least one category.

2. The system of claim 1, wherein the at least one category is an identifier for a human emotion.

3. The system of claim 1, wherein:
the memory is configured to store a user preference including at least a subset of the plurality of categories, and
the media processor is configured to alter the at least one segment of the input media stream based at least in part on the user preference.

4. The system of claim 3, wherein
the at least one category is associated with at least one segment and the user preference.

5. The system of claim 4, wherein the video veil transforms the mask-area of the input media stream such that the altered media steam incorporates at least one of at least a partially distorted or obfuscated image.

6. The system of claim 4, wherein
the memory is configured to store the preprocessed information to include information about the section of the screen.

7. The system of claim 1, wherein the media processor is configured to preprocess the input media stream to associate the at least one segment of the input media stream to the at least one category includes an image recognition system.

8. The system of claim 1, wherein the preprocess of the media processor is configured to associate the at least one category to at least one segment of the input media stream, provide the input media stream for preview and receive preprocessed information that is used at least in part to associate the at least one segment of the input media stream to the at least one category, whereby the preprocessed information includes input from a person viewing the preview.

9. A method comprising:
identifying, in a computing device, a plurality of categories;
receiving, at a computing device, an input media stream to be displayed on a screen of a display device;
constructing a mask-area with a geometric shape on a section of the screen of the display device to mask at least one segment of the input media stream;
identifying the geometric shape drawn on the section of the screen of the at least one segment of the input media stream, the section of the screen contributing to classification of the at least one segment of the input media stream into at least one category of the plurality of categories; and
altering, using the computing device, the mask-area of the at least one segment of the input media stream based at least in part on at least one category from the plurality of categories associated to the mask-area of the at least one segment of the input media stream, thereby creating an altered media stream,
wherein the altering includes using a modification layer that incorporates at least one of a video veil and an audio mask, the modification layer selectively alters the input media stream to create the altered media stream based on the at least one category, and the video veil selectively distorts or obfuscates the section of the screen.

10. The method of claim 9, further comprising
preprocessing the input media stream to associate the at least one segment of the input media stream to the at least one category of the plurality of categories; and
storing a user preference including at least a subset of the plurality of categories;
wherein the altering of the input media stream is based at least in part on the user preference.

11. The method of claim 10, wherein the preprocessing of the input media stream to associate the at least one segment of the input media stream to the at least one category of the plurality of categories includes an image recognition system.

12. The method of claim 10, wherein the preprocessing of the input media stream to associate the at least one segment of the input media stream to the at least one category of the plurality of categories further includes:
providing the input media stream for previewing, and
receiving preprocessed information that is used at least in part to associate the at least one segment of the input media stream into the at least one category, whereby the preprocessed information is from a person viewing the provided preview of the input media stream.

13. The method of claim 12, wherein the at least one category is an identifier for a human emotion.

14. The method of claim 9, wherein the video veil transforms the mask-area of the input media stream such that the altered media steam incorporates at least one of at least a partially distorted or obfuscated image.

15. The method of claim 9, wherein the audio mask transforms the input media stream such that the altered media stream incorporates at least one of a muting or an alternative soundtrack.

16. A non-transitory computer-readable medium tangibly embodying computer-executable instructions comprising instructions that, when executed by a processor, cause the processor to:
- identify a plurality of categories
- receive an input media stream to be displayed on a screen of a display device;
- construct a mask-area with a geometric shape on a section of the screen of the display device to mask at least one segment of the input media stream;
- identify the geometric shape drawn on the section of the screen of the at least one segment of the input media stream, the section of the screen contributing to classification of the at least one segment of the input media stream into at least one category of the plurality of categories;
- preprocess the input media stream to associate the mask-area of the at least one segment of the input media stream to at least one category; and
- alter the mask-area of the at least one segment of the media stream based at least in part on the at least one category to create an altered media stream,
- wherein the altering includes using a modification layer that incorporates at least one of a video veil and an audio mask, the modification layer selectively alters the input media stream to create the altered media stream, and the video veil selectively distorts or obfuscates the section of the screen.

17. The non-transitory computer-readable medium of claim 16, wherein the instructions cause the processor to:
- store a user preference including at least a subset of the plurality of categories,
- wherein the instructions to alter are based at least in part on the user preference.

18. The non-transitory computer-readable medium of claim 16,
- wherein the preprocessed information includes information about the section of the screen.

* * * * *